United States Patent Office 3,660,500
Patented May 2, 1972

---

3,660,500
PREPARATION OF 2,2'-DINITROBENZHYDROLS
Goetz E. Hardtmann, Florham Park, and Bruno S. Huegi, Caldwell, N.J., assignors to Sandoz-Wander, Inc., Hanover, N.J.
No Drawing. Filed Dec. 31, 1969, Ser. No. 889,673
Int. Cl. C07c 29/00
U.S. Cl. 260—613 R         7 Claims

ABSTRACT OF THE DISCLOSURE

Disclosed is preparation of 2,2'-dinitrobenzhydrols involving a two single phase low temperature process in which a 2-bromonitrobenzene is reacted with phenyllithium to obtain a 1-lithio-2-nitrobenzene which is then reacted with an o-nitrobenzaldehyde to obtain the 2,2'-dinitrobenzhydrol.

DISCLOSURE

The present invention relates to chemical processes, and more particularly to a low temperature process for preparation of 2,2'-dinitrobenzhydrols.

Compounds which are 2,2'-dinitrobenzhydrols are known and are useful as intermediates in the preparation of other compounds particularly in the dyestuff and pharmaceutical fields, usually after conversion by known procedures to the corresponding benzophenone and/or after reduction of one or both of the nitro groups to an amino group. For example, the 2,2'-dinitrobenzhydrols represent an attractive method of preparation of the highly useful 2,2'-dinitrobenzophenones but procedures for preparation of the 2,2'-dinitrobenzhydrols have been heretofore relatively unattractive.

The preparation of compounds which are 1-lithio-2-nitrobenzenes has been also heretofore described, see Angew Chem. 78, 1062 (1966). The utilities proposed for such compounds has however been limited because of the instability of such products.

It has now been found in accordance with the present invention that 2,2'-dinitrobenzhydrols are efficiently prepared in high yield in a procedure featuring a two-stage single phase low temperature process involving reacting in a Stage A a compound of the Formula I,

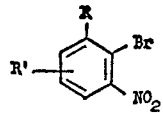

wherein

R is hydrogen, lower alkyl of 1 to 3 carbon atoms, e.g., methyl, lower alkoxy of 1 to 3 carbon atoms, e.g., methoxy, or nitro, and R' is hydrogen, lower alkyl of 1 to 3 carbon atoms, e.g., methyl, or lower alkoxy of 1 to 3 carbon atoms, e.g., methoxy, provided at least one of R and R' is hydrogen, with phenyllithium in an inert liquid organic medium at temperature in the range of from minus 120° C. to minus 80° C., with agitation to obtain in said liquid medium a product of the Formula II

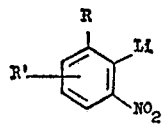

wherein R and R' are as defined and subject to previous proviso, maintaining said liquid medium containing said compound of Formula II within the temperature range aforementioned and reacting said compound II in a Stage B with a compound of Formula III

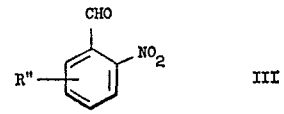

wherein

R" is hydrogen, halo of atomic weight of from 19 to 36, lower alkyl of 1 to 3 carbon atoms, e.g., methyl or lower alkoxy of 1 to 3 carbon atoms, e.g., methoxy, with agitation in an inert liquid organic medium and within the aforesaid temperature range of from minus 120° C. to minus 80° C., followed thereafter by hydrolysis to obtain a compound of the Formula IV

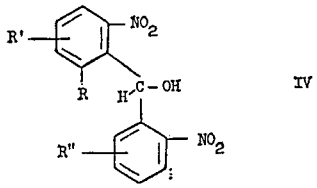

wherein R, R' and R" are as defined above and subject to the previous proviso.

The process of the invention is carried out in a single phase, that is, the reaction product of the first stage is retained in at least some portion of the liquid reaction medium in which it is formed for reaction in Stage B and the critical temperatures of the system are maintained from the onset of the Stage A reaction through a substantial portion of the period during which the Stage A product of Formula II is reacted in Stage B with the compound of Formula III. The reaction of Stage A is therefore carried out in a liquid medium useful in whole or at least in part as the reaction medium in Stage B. Such reaction medium must be an organic solvent which is liquid at the reaction temperature and inert to the reactants and products in both Stages A and B. The especially useful liquid reaction mediums are those comprising at least about a major portion of tetrahydrofuran which may conveniently be employed as essentially the sole or predominant liquid medium. Minor amounts of other organic solvents such as the ethers and petroleum ether may also be employed. In Stage A particularly the liquid medium is preferably a so-called Trapp mixture consisting essentially of approximately 4 parts tetrahydrofuran, 1 part diethyl ether and 1 part petroleum ether. From the onset of the reaction of Stage A until essentially the completion of the reaction of Stage B the reaction temperature is regulated within the range of from minus 120° C. to minus 80° C., and preferably in the range of from minus 110° C. to minus 90° C. It is important that the mole ratio of phenyllithium to compound I in Stage A is within the range of from 0.8:1 to 1.1:1, and desirably the reaction is conducted with about stoichiometric amounts. Good agitation of the reaction system during the conduct of both Stages A and B is important to obtain effective results. Vigorous agitation when combining the product of Stage A with compound III is also highly desirable. In Stage B the mole ratio of compound III to the product compound II of Stage A is preferably within the range of from 0.8:1 to 1.5:1, and is more preferably about the stoichiometric amount. Following the reaction of Stage B the resulting product is subjected to alkaline or neutral hydrolysis which may be effected at higher temperatures typically in the range of from about minus 20° C. to plus 25° C., said hydrolysis preferably accomplished by combining the reaction product of Stage B in the liquid reaction medium with an aqueous medium, e.g., ice-water, to obtain the product of Formula IV which may then be recovered by working up by established procedures. In general the process of the invention operates with surprising efficiency and provides high yields of typically of the order of at least about 50% of the product of Formula IV.

The compounds of Formula I and III employed as starting materials in the process of the invention are either known per se or may be prepared from known materials by established procedures.

The following examples illustrate the practice of the present invention.

EXAMPLE 1

2,2'-dinitrobenzhydrol

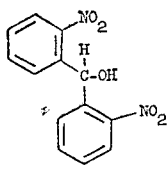

Stage A: Preparation of 1-lithio-2-nitrobenzene.—To a round bottom flask equipped with stirrer, thermometer and dropping funnel is added 100 ml. of absolute tetrahydrofuran which is then cooled with intensive stirring to minus 100° C. There is then simultaneously added while maintaining minus 100° C. to minus 105° C., 15.2 ml. of a 20% solution of phenyllithium in ether/hexane and a solution of 6.2 g. of 1-bromo-2-nitrobenzene in 40 ml. of absolute tetrahydrofuran. Strong stirring is used during such addition. The resulting mixture is stirred at minus 100° C. for 1 hour to obtain a dark blue solution of 1-lithio-2-nitrobenzene.

Stage B: Preparation of 2,2'-dinitrobenzhydrol.—To a solution of 1-lithio-2-nitrobenzene as obtained in Stage A is added dropwise at minus 100° C. a solution of 4.4 g. of o-nitrobenzaldehyde in 40 ml. of absolute tetrahydrofuran followed by vigorous mixing at minus 100° C. to minus 105° C. for 90 minutes. The mixture is then poured onto ice water and extracted 3 times each with 100 ml. of chloroform. The organic layers are combined, washed with 100 ml. of water, dried and evaporated in vacuo. The residue is crystallized by addition of diethyl ether/pentane (30 ml./5 ml.) to obtain 2,2'-dinitrobenzhydrol, M.P. 119–122° C.

EXAMPLE 2

Following the procedure of Example 1 there is obtained: 2-nitro-6-methyl-2'-nitrobenzhydrol.

What is claimed is:

1. The process for preparation of 2,2'-dinitrobenzhydrol of the formula:

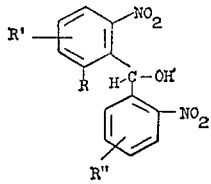

wherein

R is hydrogen, lower alkyl, lower alkoxy or nitro,

R' is hydrogen, lower alkyl or lower alkoxy, provided at least one of R and R' is hydrogen, and R" is hydrogen, halo, lower alkyl or lower alkoxy;

said process comprising reacting in a first stage a 1-bromo-2-nitrobenzene of the formula:

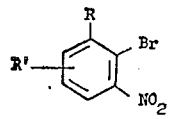

with phenyllithium in a mole ratio of phenyllithium to the 1-bromo-2-nitrobenzene within the range of from 0.8:1 to 1.1:1.0 in an inert liquid medium with agitation at a temperature regulated within the range of from about minus 120° C. to about minus 80° C. to obtain in said liquid a 1-lithio-2-nitrobenzene product of the formula:

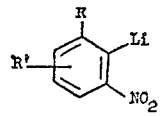

regulating said liquid medium containing said product at a temperature within the range of from about minus 120° C. to about minus 80° C., combining said product in said liquid medium with an o-nitrobenzaldehyde of the formula:

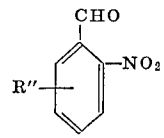

and reacting said 1-lithio-2-nitrobenzene and o-nitrobenzaldehyde in a second stage in an inert liquid medium with agitation while regulating the temperature of the medium within the range of from about minus 120° C. to about minus 80° C., and thereafter hydrolyzing the resulting product to obtain a 2,2'-dinitrobenzhydrol of the formula previously given.

2. The process of claim 1 in which the inert liquid medium in the first and second stages comprises tetrahydrofuran as at least the major portion thereof.

3. The process of claim 2 in which the mole ratio in the second stage of the o-nitrobenzaldehyde to 1-lithio-2-nitrobenzene is within the range of from 0.8:1 to 1.5:1.

4. The process of claim 3 in which the inert liquid medium in the first stage also comprises minor portions of diethyl ether and petroleum ether.

5. The process of claim 4 in which the temperature in the first stage and second stage is regulated within the range of from minus 110° C. to minus 90° C.

6. The process of claim 5 in which the hydrolysis is effected at a temperature in the range of from about 20° C. to plus 25° C.

7. The process of claim 6 in which R, R' and R" are hydrogen.

References Cited

FOREIGN PATENTS 907,828    12/1959    Great Britain _____ 260—618 B

OTHER REFERENCES

Adams et al., Organic Reactions, vol. VI (1951), pp. 340, 342–345, 351, 352, 363–365.

BERNARD HELFIN, Primary Examiner

U.S. Cl. X.R.

260—613 D, 612 D, 645, 618 B